Patented Oct. 27, 1936

2,058,797

UNITED STATES PATENT OFFICE 2,058,797

PROCESS FOR THE PRODUCTION OF OIL-SOLUBLE PHENOL ALDEHYDE RESINS WHICH ARE CAPABLE OF BEING HARDENED

Herbert Hönel, Detroit, Mich., assignor to Beck, Koller & Company, Inc., Detroit, Mich., a corporation of Delaware No Drawing. Application November 21, 1932, Serial No. 643,794

8 Claims. (Cl. 260—8)

The invention relates to oil soluble phenol aldehyde resins of the heat hardening type, and to processes for producing the same.

The present application is a continuation in part of my prior applications in the United States, Serial Nos. 506,297, now Patent 1,996,069 and 506,296, filed January 2, 1931 now Patent 1,968,080, which in turn are divisions respectively of earlier applications Serial No. 218,587, filed Sept. 9, 1927, now Patent 1,800,295, and Serial No. 362,460, filed May 11, 1929, now Patent 1,800,296.

In the above mentioned applications it was demonstrated that heat hardening condensation products produced from certain phenols and formaldehyde can be worked up with neutral varnish raw materials and waxes, under the application of heat, thus producing homogeneous and valuable products adapted for the manufacture of varnishes and the like. Suitable phenols for use in the said process include all mono- and polyvalent and mono- or polynuclear phenols wherein only two of the reaction-favorable positions (o, o and p to the phenolic group or groups) in the molecule are unoccupied. The production of the condensation products was effected with the use of a considerable excess of formaldehyde over the equimolecular quantity, in accordance with the principle of the Lederer and Manasse reaction, by means of strong alkalies at ordinary or only moderately increased temperature. The subsequently neutralized condensation product consists of a mixture of the corresponding phenol mono-alcohol and di-alcohol, or of the latter alone, or else there is produced a somewhat higher molecular condensation product which originates from the said mono-alcohol and di-alcohol or di-alcohol alone. If its production is attributable to the first-named lowest molecular products then its external characteristics include a crystalline or oily appearance; it is viscous if attributable to higher condensation stages derived from the first-resulting products.

It was also demonstrated that these condensation products are compatible with drying oils and waxes and can be caused to react therewith if higher saturated hydrocarbon radicals are substituted in the phenols. Such phenols are, e. g. thymol, p-tertiary butylphenol, p-tertiary amylphenol, o- and p-cyclohexylphenol. But these oil compatible heat hardening condensation products can also be obtained from such phenols in which the higher hydrocarbon radical is in the m-position with respect to the hydroxyl group as long as, (e. g. in the case of carvacrol) one of the reaction-favorable positions is otherwise occupied.

I have now found that condensation products of these phenols and formaldehyde of a still higher stage (which are resinous and solid at ordinary temperature) can be used and which are quite closely related to the above mentioned condensation products. Such products are not only superior to the oily or viscous varieties, because of their more convenient working-up capacity, but their reaction products with the drying oils are bases for varnishes that are even more resistant than is the case with the still lower molecular condensation products.

The solid condensation products according to the present invention are produced in essentially the same manner as the lower molecular ones, that is, only by subjecting the mixture of phenols, aqueous formaldehyde, and caustic alkali solution to considerable heating for a sufficient time until a resinous condensation product melting at about 50–60° C. or higher is obtained.

The heating can be applied from the beginning or rather after the union of the two components has taken place. The neutralization of the aqueous reaction mixture is then effected at such temperatures (if necessary at the boiling temperature) that the condensation product is of a liquid or at least kneadable form so that it can be carefully neutralized. The cooled, resin-like, solid product is thereupon dried in any suitable manner, if desired, by pulverizing and spreading out in the air.

It is also possible to carry the condensation to such an extent, that the alkaline reaction mixture achieves solidity, when cold. This mixture, although containing water, can be pulverized and then neutralized in the cold and treated as explained in the preceding paragraph.

The preferable manner, however, consists in forming a condensation product which at ordinary temperature is still liquid (or occasionally crystalline) by using ordinary or only moderately increased temperatures, and after carefully neutralizing the same and separating the aqueous liquid, heating the product to a suitable temperature for such a period until a resin is produced which has the desired melting point. By this procedure the mechanically retained water as well as the water formed during the condensation reaction is driven off.

If, according to the first method, the aqueous, alkaline mixture is kept for a prolonged period at an elevated temperature, an analogous process will take place which will be accompanied by a progressive decrease in alkali solubility. The reaction will soon terminate in a breaking up of the mixture into a liquid resinous and an aqueous layer even before all of the formaldehyde has entered into reaction. This will occur most noticeably in the case of phenols which in addition to being substituted in the ortho or para position are also substituted in the meta position. This depends to a large extent upon a greater resinifying velocity, reminding one of the well-known superiority of m-cresol over phenol in this respect. In such cases the mixture must be homogenized as by the addition of solvent agents such as alcohol; or else at least constant intermixing of both phases must be resorted to in order to secure complete union of the formaldehyde.

The most suitable quantity of formaldehyde has, in general, been found to be 1.4–1.6 mol. per 1 mol. of the phenol. The process is, however, not restricted to these proportions. As was previously stated, the condensation products correspond to the heat hardening phenol resins. When heated alone, they acquire a constantly rising melting point until they become partly or entirely infusible and insoluble. Their hardening capacity becomes more apparent if they are fused with several times (four and more) as much quantity of some neutral, chemically inactive resin at temperatures ranging from 150° C upwards to about 240° C as has already been proposed in the case of the liquid or crystalline condensation products. There thus results a soluble and permanently fusible product which, however, differs substantially (e. g. by its melting point) from the original, inactive resin, as well as from the mere mixture of the two resins initially obtained by melting them together at temperatures below 150° C. If four times the quantity is used, the melting point may be as much as 50° C. or even more above that of the inactive resin. Hereinafter, the term "hardening" will refer to the products identified by such numerical characterizations and identifications. This enormous rise in the melting point which goes hand in hand with a similar increase in viscosity is perhaps the best explanation for the extensive change undergone by the drying oils (and waxes) when they are reacted with the condensation products. When treating oils the hardening resin must be dissolved preliminary to the reaction in the material to be treated, e. g. in the oil, if necessary at elevated temperatures but not surpassing 160° C. Homogeneous products are obtained also from such resins which are insoluble in the cold and are precipitated from the warm solution when cooling down prior to the reaction. Above 160° C. the condensation and hardening reaction begins with the formation of foam and the evolution of steam, and is suitably carried out at temperatures between 200 and 230° C. The reaction, being a condensation reaction, is accompanied by the formation of water, generally in a quantity of 8 to 12 percent of the weight of the resin. The viscosity of the reaction mixture (resin and oil) increases essentially during the reaction. When a rapidly polymerizable oil, such as China-wood oil, is not being used (that is, one which suffers an increase in viscosity due to polymerization at temperatures such as those mentioned hitherto) then no further increase in viscosity is observable after the hardening reaction is finished.

The viscosity of the reaction product (that is, of the oil-and-hardening resin) depends both upon the quantity relations involved and upon the original viscosity of the oil. The hardening resin requires a certain minimum quantity of oil in order to obtain a still liquid product. If this minimum is not used then the entire reaction product will suffer a gelatinization. This minimum quantity is not only dependent upon the characteristics of the resin, but also upon the original viscosity of the oil. Hence in the case of boiled (i. e. polymerized or bodied) oils, it is appreciably higher than in the case of raw oils. In the first case it amounts, under certain conditions, to about ten times or more of the weight of the resin; in the case of raw linseed oil, it is about 1½ times as great as the weight of the resin; in the case of raw China-wood oil about 2½ times as great, and so forth.

It has been found that the resinous condensation products of a decidedly hardening nature, in contradiction to the liquid or crystalline condensation products produced with the same amount of formaldehyde, yield more or less turbid condensation products when chemically pure phenols of the herein-described class have been used. Turbidity, ranging up to the formation of flakes, will be more pronounced when relatively small proportions of oil are worked up with the condensation product. If the proportion of oil used is ten or more to one of resin, this trouble (turbidity, flakes, etc.) is generally avoided. Linseed oil in general produces more pronounced turbidity than China-wood oil. It is the more pronounced, the greater proportion of formaldehyde is used. If less than 1.4 mols of this has been employed, then, usually, no turbidity will occur; this depends to a large degree upon the nature of the phenol used.

The difficulty (turbidity or the flakes) disappears if the heating is carried to a higher degree; at 270° C. it disappears in most cases instantly; however, in working up with China-wood oil (which is of particular importance) such a heating is risky and undesirable, if not actually impossible to carry out.

It has been observed that the condensation products of non-purified phenols have less tendency to produce turbidity, etc. By such non-purified phenols are meant products which are obtained by introducing a suitable substituent into the phenol according to any known method. Generally a mixture of isomers will be formed thereby, the main constituent being a para-substituted phenol impurified by a small proportion of the ortho-substituted isomer. Occasionally also a varying proportion of the di-(o-, p-) substituted phenol may be formed. Since such phenols of the latter kind having only one unsubstituted reaction favorable position are not capable of yielding heat hardening condensation products, when condensed with formaldehyde, the presence of such phenols reduces the effectiveness of the condensation product. The presence of such phenols in large proportions should therefore be avoided. But also the presence of the o-substituted phenol is in many cases undesirable since the condensation products formed therefrom often tend to produce strong yellowing phenomena in the oil varnishes, particularly during the drying of the coatings. In addition to this, the o-substituted phenols frequently act as strong drying retarding agents. P-substituted phenols, on the other hand, do not exhibit these disadvantageous phenomena.

In agreement with the observations outlined above, the formation of turbidity, flakes, etc. can be practically entirely avoided by systematic use of mixtures of phenols. The process may be carried out by heating together the separately produced lower molecular condensation products until the solid resin is formed, or by bringing the phenols together into reaction with formaldehyde in the presence of alkali, and heating according to one of the methods hereinbefore explained until a solid, resinous condensation product is obtained. The latter procedure is more convenient and possesses certain advantages which will be referred to hereinafter.

It is also possible to employ such additional phenols which themselves alone will not produce an oil-soluble formaldehyde condensation product, viz. phenols which only comply with the condition that they have only two of the reaction favorable positions in the molecule unoccupied. If such phenols are accompanied by those having higher radicals, there will nevertheless be produced resinous formaldehyde condensation products which are completely soluble in oil. It has been ascertained unexpectedly, that to p-cresol and/or its formaldehyde condensation products is attributable to a particularly large extent the prevention of the formation of turbidity. In some cases the relative total quantity of the formaldehyde may be increased over the amount above indicated and thus produce quickly hardening resins, which, however, produce clear reaction products when worked up with oils without auxiliary treatment.

For the process of the present invention also there may be used besides those monovalent, mono-nuclear phenols which have only two reaction-favorable positions in the molecule, such poly-nuclear di-hydroxy-di-methyl methane derivatives which are capable of being produced in the well known manner from phenols and aldehydes or ketones, usually with the air of strong acids. The di-valent phenols produced from o-cresol and ketones with the aid of concentrated or anhydrous hydrochloric acid as catalyst and having the formula:

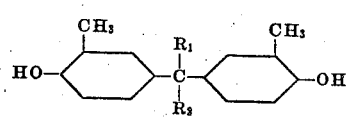

behave like the p-substituted mono-nuclear phenols; that is, they do not tend to produce the hereinbefore mentioned yellowing phenomena and the possible drying-hindering effect as is mostly the case with θ-substituted phenols. (Note: in the above given formula $R_1$ and $R_2$ indicate two hydrocarbon radicals, or else a closed chain radical.)

The following examples are intended to explain the process still further. However, these examples represent merely a fractional part of the innumerable combinational possibilities capable of producing a more or less satisfactory result.

*Example 1*

The tertiary butyl group is introduced into phenol by means of tertiary butyl chloride and aluminum chloride as catalyst. The reaction product is washed, dried, and distilled. The fraction distilling below 210° C. is removed; it contains mainly the unconsumed, excess phenol employed. The second has a melting point of 92–93° C. and consists of about 89% p-tertiary butyl phenol, about 2% of o-butylphenol and about 9% of di-butyl phenol. 166 g. of this crude product, 130 g. of commercial aqueous formaldehyde (40% by vol., or 37% by wt.) and 25 g. of 40% caustic soda solution make a clear mixture. It is heated for several days to 35–45° C. until all of the formaldehyde is combined. The condensation product is precipitated out by means of an acid (with heat if necessary) and carefully neutralized. Depending upon the temperature and duration of heating it varies from a thin to a thickly fluid consistency. It is then heated to temperatures above 100° C. and finally to temperatures above 120° C. for so long a period until a hard, clear resin results having a melting point of about 70° C. Yield about 195 g.

This resin dissolves readily in all raw and boiled oils and likewise in petroleum distillates also in the cold. When titrated in alcohol-benzol solution with alcoholic caustic potash solution and using phenolphthalein as indicator, it has an acid number of about 60. If a solution of the resin in drying oils (e. g. 1 part of resin and 3 parts of China-wood oil) is heated to temperatures above 160° C., active foaming sets in which terminates at about 220–230° C. As a result of the condensation reaction (which is accompanied by the formation of water) there occurs a decrease in weight of 10–12% of the original weight of resin. The viscosity of the resin-oil solution will after the reaction be found to have increased appreciably. In contrast to the resin which is still unused and still reactable, the oil reaction product has no acid number or a very small acid number. It is completely clear and possesses exceptional properties as a basis for varnishes.

In the 166 g. of the raw product of the phenols there are contained nearly 1 mol. of the mono-butylphenols and .08 mol. of dibutylphenol. Since the latter is capable, under the indicated conditions, of combining up to the equimolecular quantity of formaldehyde only, it follows that the former have 1.5 mols. of formaldehyde available. If 1 mol. of chemically pure p-tertiary butylphenol is worked up with 1.5 mols. formaldehyde in a complete manner exactly as described above, then there will be produced a resin which dissolves to a clear solution in oils but which when reacted therewith under heat produces rather strong turbidity.

*Example 2*

3 parts of the distilled raw product produced from phenol and crude amylene according to French Patent No. 697,711 and which in addition to p-tertiary amyl phenol as the main constituent contains varying amounts of o-amylphenol and di-amylphenol and occasionally small amounts of butyl phenol, 2 parts formaldehyde (40% by vol.) ½ part of aqueous caustic soda, are condensed as in Example 1. The condensation product is, as in the preceding case, finally neutralized and then worked up. The resulting, solid, hardening resin exhibits a behavior and properties very similar to those obtained in Example 1 and when dissolved in drying oils yields clear reaction products with them having exceptional properties.

If, on the other hand, a resin produced in a like manner from chemically pure p-tertiary amylphenol alone with even only 1.4 times the equimolecular quantity of formaldehyde be worked up with oils in the manner described, there result turbid reaction products ranging into flocculent varieties which only become clear at temperatures of about 270° C. or higher.

Example 3

1 mol. p-cyclohexylphenol yields, when worked up with excess of formaldehyde in one of the ways hereinbefore described, quite a soft resin having relatively large hardening velosity. The neutralized condensation product must be heated in a particularly careful manner in order to obtain the desired melting point or degree of condensation. Even by using only 1.3 mols. formaldehyde there is obtained a resin which quickly becomes infusible. It is very easily soluble in oils. When reacted, in the manner hereinbefore described with China-wood oil, there results a reaction product which is only very slightly turbid, but which upon prolonged standing, particularly after dissolving in varnish solvents, produces troublesome precipitates. Upon heating to 270° C. the reaction product becomes quite clear. If the product is heated with linseed oil, voluminous precipitates are formed in an astonishing manner which dissolve only very slowly even at 280–290° C.

If, on the other hand, the low molecular formaldehyle condensation product (which is mainly "oily-crystalline") is heated in the manner hereinbefore described with a likewise hardening (crystalline) condensation product made from p-cresol, then there is also obtained a quickly hardening resin, which, however yields completely clear highly viscous reaction products with China-wood oil as well as with linseed oil. In this case even 1.5 mols. formaldehyde may be used with the p-cyclohexylphenol in accordance with the standard proportion in this process.

It is, however, preferable to condense both phenols together (i. e. in common) with formaldehyde and alkali, since, first, the working up of p-cyclohexylphenol alone involves various difficulties owing to its high melting point (132° C.) and, secondly, because the production of the p-cresol condensation product under discussion is not desirable owing to its strong tendency to crystallize. The process is carried out, for example, as follows: ⅔ mol. of p-cresol and ⅓ mol. of p-cyclohexylphenol are melted together; at 70° the mass which has started to solidify is stirred with a quantity of aqueous formaldehyde corresponding to 1.5 mol. and about 20 g. of a 40% caustic soda solution, which will very soon produce a clear solution. The mixture heated to 30° C. will after several days exhibit small amounts of crystalline precipitates which upon heating above 45° C. readily dissolve. The heating is prolonged at 45–50° C. until the mixture is converted into a multi-layer product comprising an upper aqueous and a lower viscous layer. Neutralization is effected by means of an acid accompanied by thorough kneading at about 80–90° C. The condensation product when cold has a solid, resinous appearance. It is pulverized, washed and dried in the most convenient manner; if desired it may be melted together. A preferable procedure is to maintain the mixture at 25–35° C. notwithstanding the crystalline precipitation until all of the formaldehyde is combined. The thus obtained condensation product upon prolonged standing forms a crystalline, soft mass. It is heated to 110–120° C. until a solid, clear resin is formed.

The resin obtained by one or the other method is only very slightly soluble in petroleum distillates, but fairly soluble in all drying oils at temperatures around 100° C.; with China-wood oil as well as with linseed oil it yields completely clear reaction products compatible with all usual varnish solvents and which possess exceptional properties of value to the varnish art.

Example 4

108 g. (1 mol.) of a technical mixture of 60% m-cresol and 40% p-cresol are chlorinated with 85 g. of sulfuryl chloride. The quantity of the latter amounts to a slight excess over the theoretical quantity needed for the chlorination of the m-cresol. There is produced a mixture comprising essentially .6 mol. p-chlor-m-cresol and .4 mol. p-cresol. This mixture, 1 mol. p-tertiary amylphenol, and 1 mol. p-cyclohexylphenol are melted together and then condensed with 4.5 mols formaldehyde (40%) in the usual manner and at a moderately elevated temperature. The mixture is finally neutralized and the precipitated product heated to about 120° C. until a resin has formed having a melting point of about 50–60° C. This has a slightly reddish color.

While pure p-tertiary amylphenol as well as pure p-cyclohexylphenol yield hardening resins with formaldehyde and which, when reacted with oil in the manner hereinbefore described, yield undesirable precipitates or turbidity, and while the above mentioned chlorinated m-p-cresol mixture, when used alone, produces resins which are entirely incompatible with oils, the resin produced in accordance with this example is soluble in all drying oils at about 80° C. and yields with them completely and permanently clear reaction products. They are soluble in petroleum distillates in all proportions, whereas the resin itself is practically insoluble therein when cold. It precipitates also from the warm oil solution on cooling before having undergone the reaction.

Example 5

1 mol. of the m-p-cresol mixture used in Example 4 is worked up with tertiary butylchloride and aluminum chloride as catalyst in order to introduce the tertiary butyl group into the m-cresol. Since a portion of the butyl chloride withdraws from the scope of the reaction a considerable excess above the theoretically computed quantity must be used. The resulting phenol mass comprises essentially a mixture of p-cresol and o- and p-butyl m-cresols. Upon reacting with aqueous formaldehyde and caustic liquor there is first produced a clear solution, but after a short time this separates out into two layers. This objectionable feature cannot very well be obviated by addition of alkali liquor above a certain amount since this would cause the contrary result; rather must alcohol be added to the mixture to produce homogenization. A hardening condensation product even produced at ordinary temperature is relatively viscous. The solid resin produced in the manners indicated is not very adapted to be worked up with drying oils.

But if the above obtained mixture of phenols is worked up with 1 mol. p-tertiary butyl phenol, then there is obtained with 3 mol. formaldehyde (40% by vol.) and about 40–50 g. of 40% sodium hydroxide solution a clear mixture, which, if kept at ordinary or at only moderately increased temperatures until the formaldehyde is completely combined, remains clear. After this the mixture is heated above 70° C. whereby separation into two layers will soon occur. The heating is continued until a sample of the lower, resinous layer becomes solid, when cold. Then this part is pulverized, neutralized and washed with water. The thus obtained solid hardening, resinous powder may be melted together if desired, and dissolves in the warmth to a clear solution in China-wood oil and produces therewith a clear reaction product. A varnish produced therefrom, however, exhibits a strong, yellowing tendency and requires a relatively large addition of dryer in order to achieve a normal drying period. The disadvantages enumerated are attributable to the o-butyl-m-cresol. The resin is not adapted to be worked up with linseed oil since it is only poorly soluble therein.

Example 6

⅓ mol. each of p-cresol, p-tertiary-butylphenol, and p-phenylphenol (4-hydroxy-di-phenyl) and 1.6 mols aqueous formaldehyde are condensed with the aid of caustic liquor at about 45° C. The process is best carried out so that, as in Example 3, the phenols are melted together before they are worked up with the formaldehyde. After several days the "addition" (condensation) reaction is terminated and the mass is neutralized while warm. The hardening condensation product which has a tendency to crystallize is converted by heating, in the manner hereinbefore described, into a solid resinous product. This dissolves at about 100–120° C. readily in linseed oil or China-wood oil and with these yields clear reaction products having the best of properties suitable for the varnish art. The hardening resin is practically insoluble in petroleum distillates. The quantity of formaldehyde may even be increased to 1.8 mols and still lead to the production of a resin which will produce a clear reaction mass with China-wood oil. This resin, however, when dissolved in oils, produces considerable turbidity, but at 160° C., coincident with the hardening reaction, the reaction mass clears up more and more. The resin produced with 1.8 mols formaldehyde is hardly soluble in linseed oil, but the hardening reaction begins before any appreciable amount of the resin has entered into solution.

Example 7

1 mol. of the technical mixture prepared according to Examples 4 and 5 from m- and p-cresol are benzylated with benzylchloride using zinc chloride as catalyst. In this case a slight excess of benzyl chloride is used over that corresponding to the m-cresol. This undergoes simple substitution partly in the o- and partly in the p-position with respect to the hydroxyl group, whereas the p-cresol remains unchanged.

The substituted mixed product is condensed together with ½ mol. of p-cyclohexylphenol by means of 2.4 mols formaldehyde with the aid of alkali liquor in the manner hereinbefore described and is thereupon worked up further. The finally obtained, resinous, solid condensation product when heated alone rapidly reaches the infusible stage. It is readily soluble in warm drying oils and when heated therewith above 160° C. up to suitably 220–230° C. yields reaction masses which remain clear, whereas neither the condensation product of p-cresol nor those of benzyl-m-cresol can be worked up with oils and the use of p-cyclohexylphenol alone leads to the production of condensation products which possess the disadvantages enumerated in Example 3.

The reaction products with drying oils obtained according to Example 7, however, exhibit certain disadvantages such as an appreciably retarded drying and a strong yellowing tendency during such drying.

Example 8

176 g. of a mixture of o- and p-cyclohexyphenol (corresponding to 1 mol.) which is obtained by condensation of tetrahydrobenzol with phenol in the presence of a catalyst, and 122 g. formaldehyde (40% vol., corresponding to 1.5 mols) are condensed in the manner hereinbefore described at room temperature, and, after the union has occured, neutralized. The liquid condensation product is converted into the solid, resinous condition by heating to 120–140° C. The solid product is very easily soluble in petroleum distillates and oils also at ordinary temperatures, yielding therewith clear reaction masses when heated. A varnish produced therefrom, however, exhibits during drying rather a strong yellowing tendency which is attributable to the o-substituted phenol. On the other hand its drying velocity is in no wise affected.

Example 9 o-phenylphenol (2-hydroxy-diphenyl) is readily worked up in the hereinbefore described manner with aqueous formaldehyde and caustic alkali solution. The resinous, solid condensation product produced from 1 mol. of this phenol with 1.4 mols formaldehyde is slowly hardening and yields a clear reaction product with China-wood oil. The resin is not compatible with linseed oil; rather it hardens before any appreciable solution occurs, notwithstanding its relatively slow hardening capacity.

By heating the still liquid condensation product with one obtained from 1 mol. p-cyclohexylphenol and 1.4 mols formaldehyde (and which is partly liquid and partly crystalline) a rapidly hardening resin is obtained which may be worked up with China-wood oil as well as with linseed oil in the manner hereinbefore indicated as suitable. Whereas a resin produced from p-cyclohexylphenol alone, when reacted with linseed oil, as hereinbefore described, produces thick, voluminous precipitates which dissolve very slowly at temperatures around 280° C., the resin obtained from both of the aforementioned phenols yields only slightly turbid reaction masses with linseed oil which at 280° C. rapidly becomes clear. China-wood oil in any case produces a clear reaction product.

The o-phenylphenol leads, in contradistinction to various other o-substituted phenols, to resins which do not disturb the drying action of the oils and which give rise to only relatively feeble yellowing tendencies.

Example 10

A viscous condensation product produced in the usual manner from ½ mol. (=1 equivalent) β,β-bis-(4-hydroxy-,3-methylphenyl)-propane (di-o-cresylolpropane) and 1 mol. formaldehyde, and a fluid condensation product produced from 1 mol. of p-tertiary-butyl-phenol (=1 equivalent) and 1.5 mols formaldehyde are heated together above 100° C. until a resin is obtained which is solid when cold.

This hardens quickly and dissolves readily in China-wood oil or linseed oil and other drying oils and forms therewith clear reaction masses having the best of varnish properties.

The first-named phenol may be produced from 1 part of acetone and 8 parts of o-cresol (i. e. more than double the theoretically required quantity) with the aid of concentrated or gaseous hydrochloric acid according to the method indicated by Dianin.

The still liquid, hardening condensation product produced from the di-o-cresylolpropane may be worked up by rapid heating with China-wood oil into slightly turbid although otherwise homogeneous reaction masses; but it is entirely incompatible with linseed oil.

In the preceding examples the aqueous formaldehyde may be replaced wholly or in part by its solid polymeric forms. The alkali liquor may also be replaced by strong organic bases which, however, are not alone suitable for producing homogeneous mixtures when used with aqueous formaldehyde. To obtain such homogeneous mixtures it is necessary to add a more or less considerable quantity of alcohol.

*Example 11*

150 g. pure p-tertiary butylphenol (1 mol.), 30 g. paraformaldehyde, 82 g. aqueous formaldehyde (40% vol.—that is making a total of 2 mols of formaldehyde), 30 g. tri-ethanol-amine, produce by gentle heating a homogeneous mixture. This is left for a week at 40° C. and is then neutralized. The liquid condensation product produced is heated in the same manner as was described in the case of Example 1.

In spite of the relatively large amount of formaldehyde there results a resin which is but slowly hardening. Whereas a resin prepared from p-tertiary-butylphenol with 1.5 mols formaldehyde and alkali as catalyst, when melted with four times its quantity of a rosin-glycerine-ester (m. p. 60–70° C.) leads to a resin having a melting point of 110–120° C. The resin prepared according to Example 11 and under like conditions leads to a melting point of only 98–108° C. The product yields clear reaction masses with oils probably owing to its reduced hardening energy.

The products obtained according to the process of the invention may be reacted not only with oils alone, but with the most varied combinations of oils and resins. This includes all complicated ester-like products of polyhydric alcohols, polybasic acids, and drying oils or their fatty acids. Care must be observed that these condensation products have a suitably low viscosity and are capable of being worked up with those hardening resins, since the latter, as above recited, cause a considerable increase in viscosity which may exceed a definite limit.

What I claim is:

1. A process for producing oil-soluble hardening phenol-aldehyde resins, which comprises reacting, in the absence of unsubstituted phenol, (1) a phenol in which only two of the reaction favorable positions (o-, o-, p-) in the molecule are unoccupied and which carries at least one higher hydrocarbon radical as substituent having at least three saturated carbon atoms, with (2) formaldehyde in excess of the equimolecular quantity with the aid of a strongly alkaline contact agent by maintaining the two components in contact for a prolonged period of time until the chemical union of the components has practically completely occurred, and thereafter employing elevated temperatures to produce a condensation product which is solid and resinous at ordinary temperatures, the process including the neutralization of the contact agent.

2. A process for producing oil-soluble hardening phenol-aldehyde resins, which comprises (1) maintaining in contact for a prolonged period of time at moderate temperatures, in the absence of unsubstituted phenol (a) a phenol in which only two of the reaction favorable positions (o-, o-, p-) in the molecule are unoccupied and which carries at least one higher hydrocarbon radical as substituent having at least three saturated carbon atoms, (b) formaldehyde and (c) a strongly alkaline contact agent until a considerable excess of formaldehyde over the equimolecular quantity is compounded, (2) neutralizing the contact agent and (3) heating the condensation product at elevated temperatures until a product is obtained which is solid and resinous at ordinary temperatures.

3. An oil-soluble hardenable phenol-aldehyde resin which is solid at ordinary temperatures, produced by condensing (1) formaldehyde in excess of the equimolecular quantity and in the absence of unsubstituted phenol with (2) a phenol in which only two of the reaction favorable positions (o-, o-, p-) in the molecule are unoccupied and which carry at least one higher hydrocarbon radical as substituent having at least three saturated carbon atoms, said condensation being effected by maintaining said components in contact for a prolonged period of time in the presence of strongly alkaline contact agents, whereupon the condensation product formed thereby is further condensed by the application of heat to a solid resin; the process including neutralization of the catalyst.

4. A hardenable solid phenol-aldehyde resin in which a phenol is compounded with a considerable excess of formaldehyde over the equimolecular quantity, in which phenol only two of the reaction favorable positions (o-, o-, p-) in the molecule are unoccupied and which carries at least one higher hydrocarbon radical as substituent having at least three saturated carbon atoms, said resin being compatible with drying oils and compositions containing the same at least in the heat and capable of undergoing further condensation reaction when heated therewith at temperatures surpassing 150° C., the said resin being characterized in that thereby is caused such an increase of viscosity that a gelatinous, insoluble mass is obtained when less than a certain minimum proportion of oil is employed, while a still liquid and soluble reaction mass is only obtained when at least this minimum proportion is employed, said minimum proportion generally being a multiple of the quantity of resin used, the reaction mass in any case being permanently homogeneous, the said phenol-aldehyde resin also being characterized by the fact that, when melted together with a multiple proportion of a substantially neutral solid resin and heated therewith at reaction temperatures as indicated above, a new soluble homogeneous resin is obtained distinguished from the said neutral resin by its substantially higher melting point and viscosity.

5. An oil-soluble, solid, hardenable phenol-aldehyde resin in which a considerable excess of formaldehyde over the equimolecular quantity is compounded with a mixture of phenols comprising phenols in which only two of the reaction favorable positions (o-, o-, p-) in the molecule are unoccupied and which carry at least one higher hydrocarbon radical as substituent having at least three saturated carbon atoms, and phenols which comply only with the first condition.

6. A process which comprises reacting together by application of heat (1) at least one material selected from the class consisting of substantially neutral varnish raw materials and waxes and (2) an oil-soluble, solid, hardenable phenol-aldehyde resin in which a considerable excess of formaldehyde over the equimolecular quantity is compounded with a phenol in which only two of the reaction favorable positions (o-, o-, p-) in the molecule are unoccupied and which carries at least one higher hydrocarbon radical as substituent having at least three saturated carbon atoms.

7. A homogeneous artificial mass which comprises the reaction product of (1) at least one material selected from the class consisting of substantially neutral varnish raw materials and waxes with (2) an oil-soluble, solid, hardenable phenol-aldehyde resin in which a considerable excess of formaldehyde over the equimolecular quantity is compounded with a phenol in which only two of the reaction favorable positions (o-, o-, p-) in the molecule are unoccupied and which carries at least one higher hydrocarbon radical as substituent having at least three saturated carbon atoms.

8. A varnish basic material comprising the reaction product of (1) a drying oil with (2) an oil-soluble hardenable phenol-aldehyde resin which is solid at ordinary temperatures, produced by condensing formaldehyde in excess of the equimolecular quantity in the absence of unsubstituted phenol with a phenol in which only two of the reaction favorable positions (o-, o-, p-) in the molecule are unoccupied and which carry at least one higher hydrocarbon radical as substituent having at least three saturated carbon atoms, said condensation being effected by maintaining the components in contact for a prolonged period of time in the presence of strongly alkaline contact agents, which are neutralized after the chemical union of the components is effected.

HERBERT HÖNEL.